(12) United States Patent
Pagnol et al.

(10) Patent No.: US 6,483,426 B1
(45) Date of Patent: Nov. 19, 2002

(54) METHOD OF IDENTIFYING A PLURALITY OF TRANSPONDERS, ANALYSIS APPARATUS AND A TRANSPONDER FOR IMPLEMENTING SUCH A METHOD

(76) Inventors: Frédéric Pagnol, Domaine de l'Etoile 06610, La Gaude (FR); Saak Dertadian, Villa Gaspard Rue des Ecoles 06670, Colomars (FR)

( * ) Notice: Subject to any disclaimer, the term of this patent is extended or adjusted under 35 U.S.C. 154(b) by 0 days.

(21) Appl. No.: 09/207,317

(22) Filed: Dec. 7, 1998

(30) Foreign Application Priority Data

Dec. 10, 1997 (FR) .......................................... 97 15624

(51) Int. Cl.⁷ ................................................ H04Q 5/22
(52) U.S. Cl. .................. 340/10.1; 340/10.2; 340/10.31; 340/10.3; 340/10.32; 340/10.33; 340/10.42; 340/5.8; 340/572.1; 342/42; 342/44
(58) Field of Search ............................... 340/10.1, 10.2, 340/10.31, 10.33, 10.42, 5.8, 572.1; 342/42, 44; 710/46

(56) References Cited

U.S. PATENT DOCUMENTS

| | | | | |
|---|---|---|---|---|
| 4,071,908 A | * | 1/1978 | Brophy et al. ................. | 710/46 |
| 5,434,572 A | | 7/1995 | Smith | |
| 5,686,902 A | * | 11/1997 | Reis et al. ............. | 340/825.49 |
| 5,751,570 A | * | 5/1998 | Stobbe et al. ................. | 342/44 |
| 6,172,596 B1 | * | 1/2001 | Cesar et al. ............. | 340/10.41 |

FOREIGN PATENT DOCUMENTS

| | | |
|---|---|---|
| DE | 196 39 888 C1 | 11/1997 |
| EP | 0 285 419 A2 | 10/1988 |
| EP | 0 495 708 A1 | 7/1992 |
| EP | 0 696 011 A2 | 2/1996 |
| EP | 0 702 323 A2 | 3/1996 |
| EP | 0 777 194 A1 | 6/1997 |

* cited by examiner

*Primary Examiner*—Brian Zimmerman
*Assistant Examiner*—Yves Dalencourt
(74) *Attorney, Agent, or Firm*—Oliff & Berridge, PLCV (57) ABSTRACT

A method identifying a set of transponders situated in the interrogation field of analysis apparatus, with each transponder storing a different identity code. The analysis apparatus first transmits data, and each unidentified transponder compares this data with a portion of its own identity code, which portion is selected by the analysis apparatus, and then transmits in a time window, selected at least as a function of the result of the comparison. The analysis apparatus, then receives the data transmitted by the transponders, determines whether data enables any of the transponders identity codes. The analysis apparatus then emits modified data so that after a finite number of iterations the data causes each of the transponders to transmit data enabling the individual transponder's identity code to be determined.

32 Claims, 5 Drawing Sheets

METHOD OF IDENTIFYING A PLURALITY OF TRANSPONDERS, ANALYSIS APPARATUS AND A TRANSPONDER FOR IMPLEMENTING SUCH A METHOD

The present invention relates to a method enabling a plurality of transponders present simultaneously in the field of analysis apparatus to be identified, and also to analysis apparatus and to a set of transponders for implementing such a method.

Numerous analysis apparatuses are known that enable a transponder to be identified for example to control access to a building.

Most such analysis apparatuses are adapted to identify only a small number of transponders at a time, which is not a problem when controlling access to a building since the number of people, and thus the number of transponders, capable of arriving simultaneously in the field of the analysis apparatus is no more than about ten.

By way of example, mention can be made of European patent application EP 0 285 419 which describes analysis apparatus for requiring a successive interrogations to determine an n-bit identity code.

Such analysis apparatus is unsuitable for the case where the identity code of each transponder is encoded on a large number of bits, e.g. 32 bits, and where a large number of transponders, e.g. more than 50, are present simultaneously in the field of the analysis apparatus.

Unfortunately this situation arises when transponders are used for remote identification of articles present in a container and for providing information concerning their origins, for example.

A particular object of the present invention is to enable a plurality of transponders to be identified in a relatively short length of time, for example to be able to determine how many of them there are, and to be able to address each of them separately to interrogate them.

The invention achieves this by a novel method of identifying a set of transponders situated in the field of analysis apparatus, each transponder having a different identity code in memory, the method being characterized by the fact that it comprises the steps consisting in:

a) causing the analysis apparatus to transmit data for comparison with a portion of the identity code as selected by the analysis apparatus;

b) causing each as-yet unidentified transponder to compare the received data and the portion of its identity code as selected by the analysis apparatus;

c) causing each as-yet unidentified transponder to transmit in at least one time window selected from a set of time windows common to the set of transponders as a function of the result of said comparison; and d) causing the analysis apparatus to analyze the data transmitted by the transponders in said set of time windows, and when the data transmitted by the transponders does not enable a transponder identity code to be determined at least in part, causing the apparatus to start again with data that has been modified in such a manner that, within a finite number of iterations, the transponders are caused to transmit data enabling the identity code of at least one of the transponders to be determined, at least in part.

In a preferred implementation of the method, each transponder includes a comparison register in which the data for comparison is stored.

This comparison register is preferably organized to store a plurality of binary words, and the identity code is likewise made up of binary words.

In a preferred implementation of the invention, the analysis apparatus modifies, one at a time, a binary word of given significance in the comparison register, and each as-yet unidentified transponder compares the most-recently modified word with the binary word of corresponding significance of the identity code.

The portion of the identity code that is to be subjected to comparison is selected by selecting the significance of each new binary word that is to be stored in the comparison register.

Preferably, the method of the invention further comprises the step consisting in:

causing the analysis apparatus, whenever the data previously received thereby makes this possible to determine at least a portion of the identity code of one or more transponders to send an order causing said transponder(s) to transmit its/their identity code(s); and analyzing said identity code(s) as received to determine whether only one identity code was transmitted or whether there has been interference associated with a plurality of different codes being transmitted simultaneously, and in the event of only one identity code being received, storing said code.

Results that are particularly satisfying in terms of the time required to identify all of the transponders have been obtained when the identification method comprises the steps consisting in;

a) using the analysis apparatus to transmit data to be compared with a portion of the identity code selected by the analysis apparatus;

b) within each unidentified transponder, comparing the received data and a corresponding portion of the transponder's identity code;

c) causing each unidentified transponder to transmit in at least one time window selected from a set of time windows common to the set of transponders;

d) using the analysis apparatus to analyze the data transmitted by the transponders in said set of time windows, and when the data transmitted by the transponders does not enable at least part of the identity code of at least one of the transponders to be identified, beginning again with data modified in such a manner that, after a finite number of iterations, the transponders transmit data making it possible to determine at least a part of the identity code of at least one of the transponders:

e) causing the analysis apparatus, when the data previously received thereby makes it possible to determine at least a portion of the identity code of one or more transponders, to transmit an order causing every such transponder to transmit its own identity code; and f) analyzing reception of the identity code to determine whether a single identity code has been transmitted or whether interference has occurred associated with simultaneous transmission of a plurality of different codes, and when only one identity code is received, storing said code.

Preferably, when a plurality of transponders transmit a plurality of different identity codes simultaneously and they interfere with one another, the method of the invention further includes the step consisting in sending new data to be compared with a new portion of the identity code in said transponders, other than the portion already determined by the analysis apparatus, optionally in modifying said new data until said new identity code portion has been determined, and thereafter in causing the transponder(s) for which the new identity code portion has been determined to transmit its/their identity code(s), and in the event of interference restarting the process for determining the identity code again by causing the comparison to be performed on an as-yet undetermined portion of the identity code, until only one identity code is received from the transponders.

In a preferred implementation of the method of the invention, each identified transponder is put into a standby mode in which it ceases to transmit the result of comparing its own identity code with the data transmitted by the analysis apparatus.

Preferably, each transponder that has been identified is put into said standby mode by using the analysis apparatus to transmit its identity code. The identity code is advantageously transmitted by loading said identity code into the comparison register, with the transponder whose comparison register matches its identity code then putting itself into a standby mode.

The invention also provides a transponder of the type comprising an identification code such as a serial number stored in a memory and means for remote communication with analysis apparatus, the transponder being characterized by the fact that it includes a comparison register in which data from the analysis apparatus can be stored, calculation means for comparing at least a portion of the identity code with at least a portion of the comparison register, and means for transmitting the result of the comparison in at least one time window selected from a set of time windows, the particular time window depending on the result of the comparison.

The invention also provides analysis apparatus for a plurality of transponders having different identity codes, the apparatus being characterized by the fact that it includes processor means organized to determine the identity codes of a plurality of transponders placed in the field of the analysis apparatus, said analysis apparatus being suitable for:

transmitting a write order associated with identity data, said order causing said identity data to be stored in the transponders at a particular address selected by the analysis apparatus;

analyzing the response from as-yet unidentified transponders in a set of time windows after said identity data has been transmitted;

transmitting a read order to cause the transponders whose identity codes have been determined in part to send their identity codes in full;

transmitting a new write order associated with new identity data in the event of interference between the data transmitted by the transponders, so as to end up by causing only one transponder at a time to send its identity code and storing said code; and repeating the above steps so as to identity all of the transponders in turn.

The invention also provides analysis apparatus and a set of transponders for implementing a method as defined above.

By means of the invention, it is possible to identify a large number of transponders in a relatively short length of time, and to do so even if the identity code of each transponder is encoded on a large number of bits, e.g. 32 bits.

Other characteristics and advantages of the present invention appear on reading the following detailed description of a non-limiting implementations of the invention, and on examining the accompanying drawings, in which.

Figure 1:
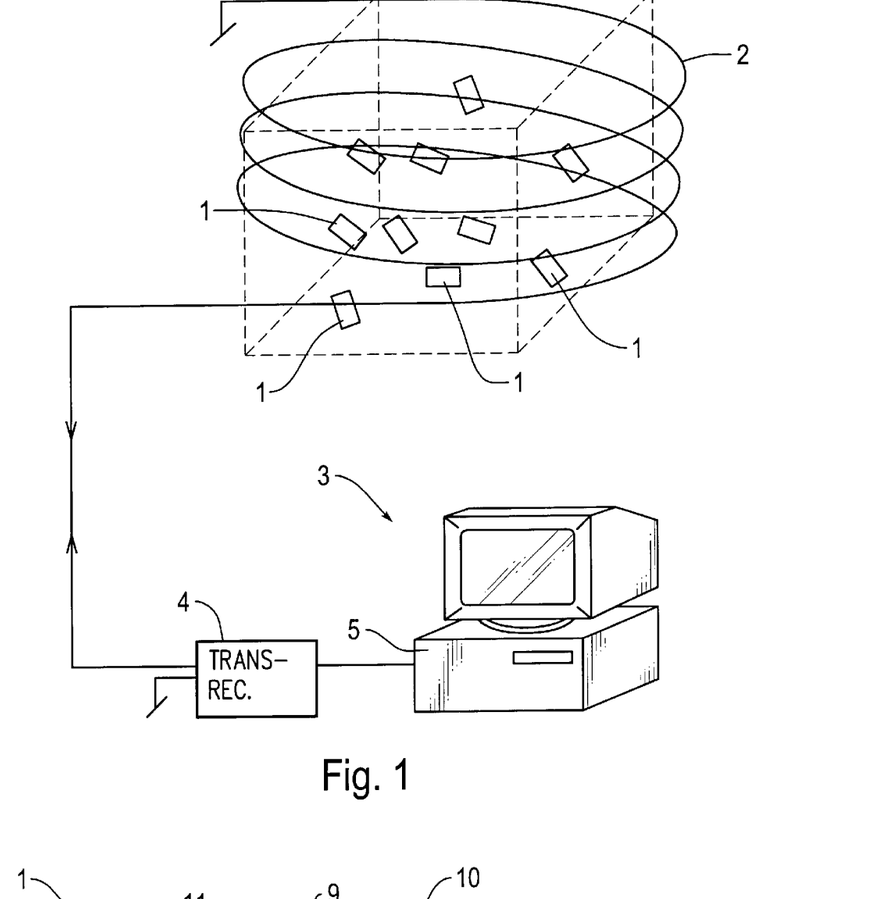
FIG. 1 is a diagrammatic view showing a set of transponders placed simultaneously in the field of analysis apparatus.

FIG. 1 shows a plurality of transponders 1 placed in the magnetic field of an antenna 2 of analysis apparatus 3, which apparatus includes a transmitter-receiver connected to the antenna 2 and processor means 5 such as a microcomputer for processing information received by the transmitter-receiver 4 and for controlling transmission thereby.

The antenna 2 is constituted by a solenoid within which the field is substantially constant.

The analysis apparatus 3 is organized to identify transponders 1 that are located inside the antenna 2, with the field being strong enough to deliver sufficient energy to the transponders to enable them to be activated.

By way of example, the transponders 1 are in the form of labels and they are all contained in a common enclosure inside the antenna 2, which enclosure is represented by dashed lines.

In the example described, information is interchanged by amplitude modulation of a signal at a frequency of 125 kHz.

Figure 2:
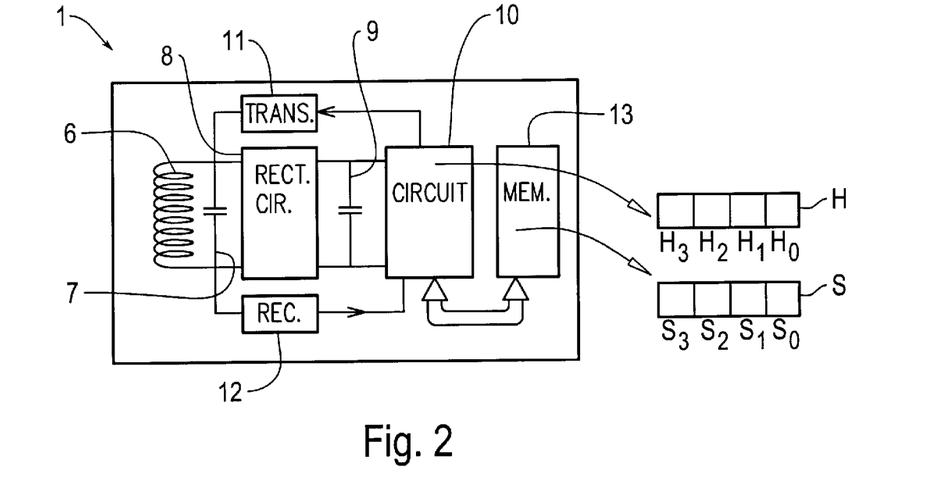
FIG. 2 is a diagram of a transponder in isolation.

FIG. 2 shows a transponder 1.

The transponder has an internal antenna 6 coupled to a tuning capacitor 7, a rectifier circuit 8 to rectify the current induced in the antenna 6, a capacitor 9 for smoothing the current rectified in this way, and a circuit 10 which is programmed to perform certain functions in response to orders received from the analysis apparatus 3, in particular to cause data to be transmitted by the transponder, which functions are described in greater detail below.

The circuit 10 is coupled to a transmitter 11 to modulate and transmit data to the analysis apparatus 3, via the antenna 6, and a receiver 12 to demodulate and receive data transmitted by the analysis apparatus 3, in conventional manner.

The transponder 1 also has a memory 13 of the EEPROM type, associated with the circuit 10.

In the memory 13, a serial number S is written in non-erasable manner, which number is encoded on four bytes $S_3$, $S_2$, $S_1$, $S_0$ giving a total of 32 bits.

Figure 4:
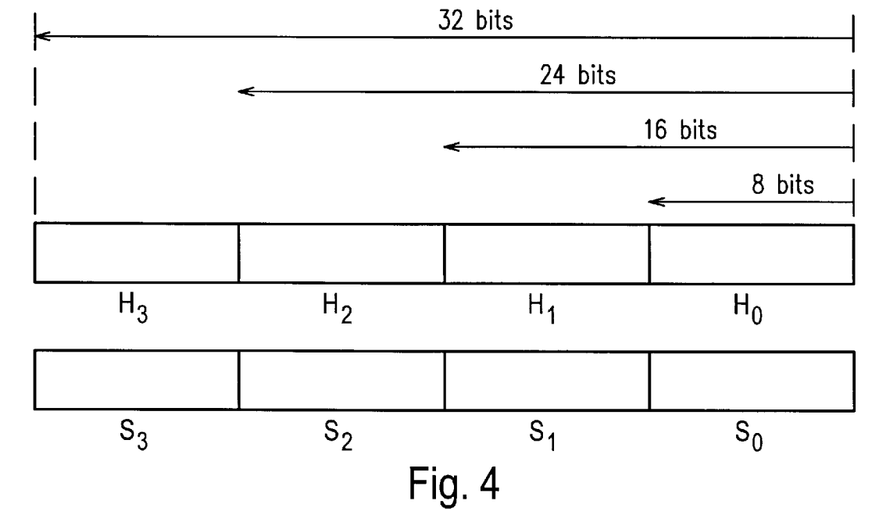
FIG. 4 shows how the information stored in the comparison register is made up of 8-bit bytes.

The circuit 10 has a buffer memory referred to below as the comparison register H, and capable of storing four respective addresses $H_3$, $H_2$, $H_1$, and $H_0$, as shown in FIG. 4.

It is assumed below that all of the transponders placed in the field of the antenna 2 have different serial numbers.

Figure 3:
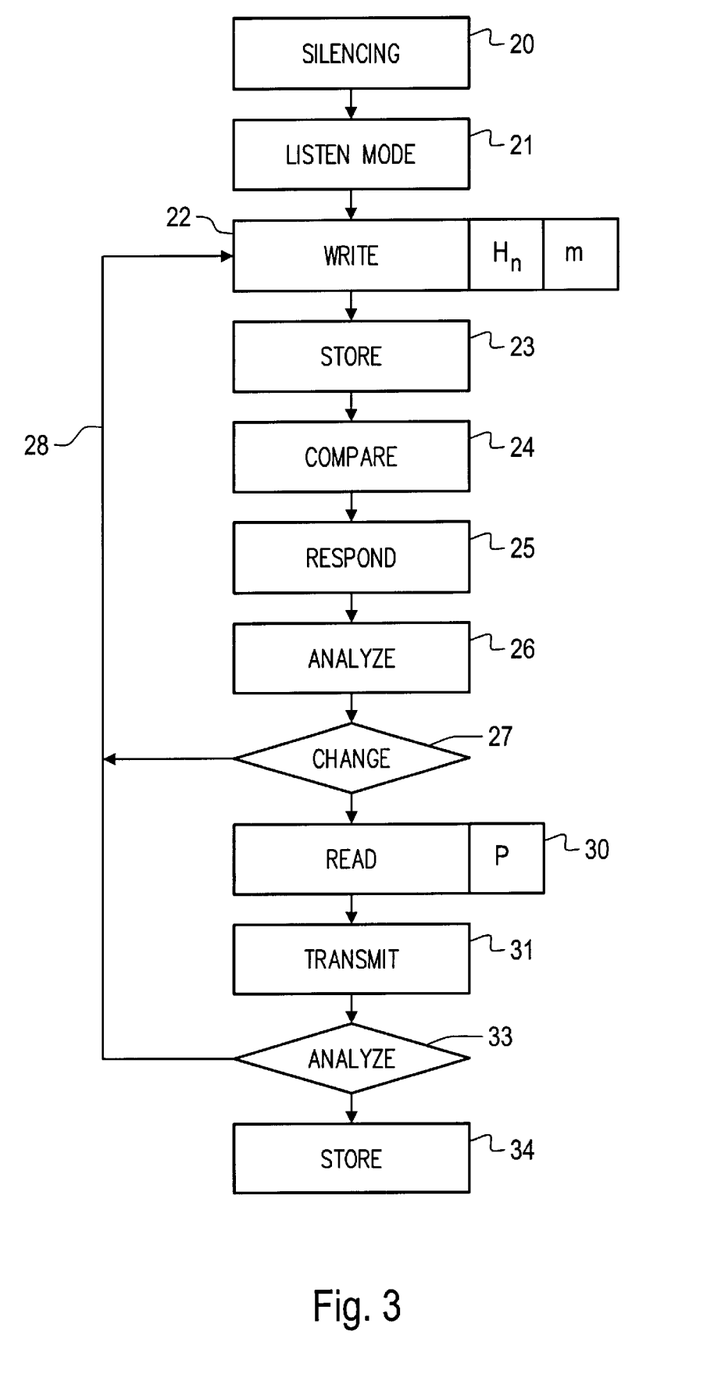
FIG. 3 is a flow chart showing the steps of a first implementation of the method enabling the transponders to be identified.

FIG. 3 shows a first implementation of the method of the invention.

In the example described, when the magnetic field of the antenna 2 is established, all of the transponders start continuous transmission of preprogrammed information.

That is why the method begins in step 20 by silencing the transponders 1. To do this, the analysis apparatus 3 sends a specific instruction to the transponders 1 to place all of them in a "listen" mode, in which they do not transmit unless instructed to do so, i.e. they transmit only in response to particular instructions transmitted by the analysis apparatus 3.

In following step 21, it is assumed that all of the transponders are in listen mode.

In step 22, the analysis apparatus 3 transmits an order to write the value m at address $H_n$, where the value of the index n generally lies in the range 0 to 3, and is equal to 0 at the beginning of the identification process.

The value m is encoded on 8 bits, and it lies in general in the hexadecimal range 00 to FF, m is initially given the hexadecimal value 80.

At step 23, all of the transponders 1 store the value m at address $H_n$, i.e. the value 80 at address $H_0$ at the beginning of the identification process.

Thereafter, in step 24, the transponders 1 compare the contents of address $H_n$ with the corresponding byte $S_n$ of their respective serial numbers.

At the beginning of the identification process, n is equal to 0 and the transponders 1 therefore compare the least significant byte $H_0$ in their comparison registers 8 with the least significant bytes $S_0$ of their serial numbers.

The comparison in question consists in determining whether the value m stored at address $H_n$ is greater than equal to, or less than $S_n$.

When the comparison does not apply to the least significant byte $S_0$, then the transponder 1 also checks in the presently-described implementation for a match between the contents of each address of lower significance and each corresponding address of its serial number.

In other words, if a comparison is being made, for example, on byte $S_2$ of the serial number, then the transponder 1 also checks for a match between bytes $S_1$ and $S_0$ and the contents of address $H_1$ and $H_0$ respectively.

As a function of the result of the comparison, and as explained possibly also providing that the contents of the less significant addresses and the corresponding bytes of the serial number match, each transponder 1 responds in a step 25 by transmitting during a predetermined time window, unless the analysis apparatus has already put the transponder into a standby mode, as described below.

Transmission from the transponders 1 takes place in the presently-described implementation in one of four groups $G_3$, $G_2$, $G_1$, and $G_0$, each of three time windows, with each group $G_n$ being associated with a different value for the index n.

Figure 5:
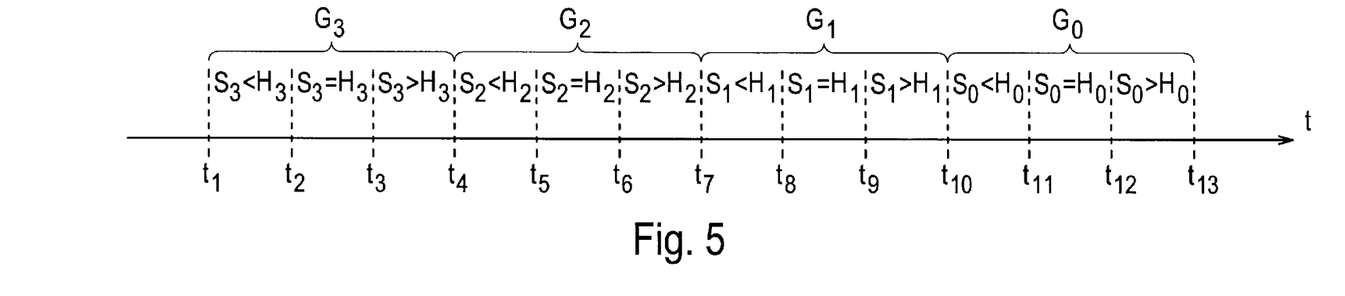
FIG. 5 is a timing diagram showing the various time windows in which the transponders can transmit the results of comparison between their comparison registers and their serial numbers.

The three successive time windows of each group $G_n$ correspond respectively to the case where $S_n$ is less than the contents of the address $H_n$ which is written $S_n<H_n$ in FIG. 5, to the case where they are equal which is written $S_n=H_n$, and to the case where $S_n$ is greater than the contents of the comparison register at address $H_n$ which is written $S_n>H_n$.

As shown in FIG. 5, the first group $G_3$ of time windows extends between instants $t_1$ and $t_4$, the second group $G_2$ between instants $t_4$ and $t_7$, the third group $G_1$ between instants $t_7$ and $t_{10}$, and the fourth group $G_0$ between instants $t_{10}$ and $t_{13}$.

All of the time windows are of the same duration. Instant $t_1$ is situated at a predetermined time interval from the end of data transmission by the analysis apparatus.

At step 26, the analysis apparatus 3 analyzes the responses coming from the transponders 1.

For each group $G_n$ of three time windows, eight situations can arise:

the first situation corresponds to the analysis apparatus 3 receiving a signal 111, i.e. receiving binary value 1 in each of the three time windows of a single group $G_n$ allocated to the result of the comparison between the contents of address $H_n$ in the comparison registers and the bytes $S_n$ of the serial numbers; this means that there is at least one transponder 1 whose byte $S_n$ is less than the contents of address $H_n$, at least one transponder 1 whose byte $S_n$ is equal to the contents of address $H_n$, and at least one transponder 1 whose byte $S_n$ is greater than the contents of address $H_n$;

the second situation corresponds to the analysis apparatus 3 receiving the signal 100, i.e. binary value 1 in the first time window only of the group $G_n$ under consideration; this means that all of the transponders 1 have their bytes $S_n$ less than the value m stored at address $H_n$ of their respective comparison registers H;

the third situation corresponds to the analysis apparatus receiving the signal 110, i.e. binary value 1 in each of the first two time windows of the group under consideration; this means that the byte $S_n$ in each transponder 1 is either less than or equal to the value m, and that there is no transponder 1 whose byte $S_n$ is greater than the contents of the address $H_n$ in the comparison register;

the fourth situation corresponds to receiving the signal 011, i.e. binary value 1 in each of the last two time windows; this means that the byte $S_n$ in each transponder 1 is either equal to or greater than the contents of the address $H_n$ of its comparison register H;

the fifth situation corresponds to receiving the signal 001, i.e. binary value 1 in the last time window only of the group $G_n$ under consideration; this means that all of the transponders have a byte $S_n$ greater than the contents of the address $H_n$ of their comparison registers;

the sixth case corresponds to receiving the signal 101, i.e. binary value 1 in the first and the last time windows only of the group $G_n$; this means that some transponders have a byte $S_n$ less then the contents of the address $H_n$ and others have the byte $S_n$ greater than the contents of the address $H_n$;

the seventh situation corresponds to receiving the signal 010, i.e. the binary value 1 in the second time window only of group $G_n$; this means that all of the transponders have their respective bytes $S_n$ equal to the contents of the address $H_n$; and finally the eighth and last situation corresponds to receiving the signal 000, i.e. no binary value 1 in any of the three time windows of group $G_n$; this means either that all of the transponders have been identified, or that the group under consideration is the group $G_q$ where q=1, 2, or 3, and there is no equality between any of the bytes $S_w$ and $h_w$ where w is an integer in the range 0 to q−1.

In the following step 27, if no transponder has byte $S_n$ of its serial number equal to the value m stored at address $H_n$ of its comparison register H, then the value of m is changed and the method returns to step 22, as represented by arrow 28.

The particular new value that is selected for m depends on the current situation: if all of the transponders have their respective bytes $S_n$ greater than the value m, then it is increased; in contrast, if all of the transponders have their respective bytes $S_n$ less than the value of m, then, on the contrary, it is decreased.

The value of m is modified without changing the value of n so that by interval halving a value is obtained as quickly as possible for which equality is obtained between the byte $S_n$ and the contents of the register $H_n$ of at least one transponder, giving a maximum of eight iterations; if transponders 1 having their byte $S_n$ greater than the value m are present simultaneously with transponders having their byte $S_n$ less than the value m, then attention is paid initially only to those transponders for which the byte $S_n$ is greater than the value m, for example, with the other transponders being dealt with subsequently.

When the analysis apparatus 3 receives binary value 1 in the second time window of the group $G_n$ under consideration, that means that there is at least one transponder 1 for which $S_n$ is equal to the value m; under such circumstances, in a step 30, a read order is sent to read the serial number of said transponder(s).

This read order is given and index value p which is taken to be equal to the current value of n.

If p=0, then only those transponders for which there is an 8-bit match between the comparison register H and the serial number S reply, i.e. only those for which there is a match between $S_0$ and the contents of address $H_0$.

If p=1, only those transponders for which there is a 16-bit match between the comparison register H and the serial number S reply, i.e. only those for which there is a match between both $S_1$ and $S_0$ and the contents of addresses $H_1$ and $H_0$ respectively.

If p=2, only those transponders for which there is a 24-bit match between the comparison register H and the serial number S reply, i.e. only those for which there is a match between $S_2$, $S_1$, and $S_0$ and the contents of addresses $H_2$, $H_1$, and $H_0$, respectively.

In step 31, every transponder concerned simultaneously transmits the four bytes $S_2$, $S_1$, and $S_0$ constituting its serial number S.

If only one transponder 1 is responding, then in step 33 the analysis apparatus 3 is capable of analyzing and reading the serial number so as to store it in step 34 and then return to the method to identify the remaining transponders.

However, if a plurality of transponders 1 reply, given that their serial numbers are different, then there is mutual interference which is detected by the analysis apparatus 3.

Another term is "collision", and in any event it is necessary to perform comparison on a larger number of bits and to determine the value of at least one byte of greater significance in the serial number.

When a plurality of transponders share the same byte $S_0$, the value of the byte $S_1$ is determined, and where necessary, i.e. when a plurality of transponders share serial numbers that match on 16 bits, then the value of the byte $S_3$ is determined likewise, but that is exceptional.

To determine the value of byte $S_{n+1}$, the method returns to step 22 after incrementing the value of n by unity.

Each identified transponder is placed in a listen mode in which it ceases to transmit the results of comparisons between its own serial number and the comparison register H, by loading its register H with its own serial number.

Figure 6:
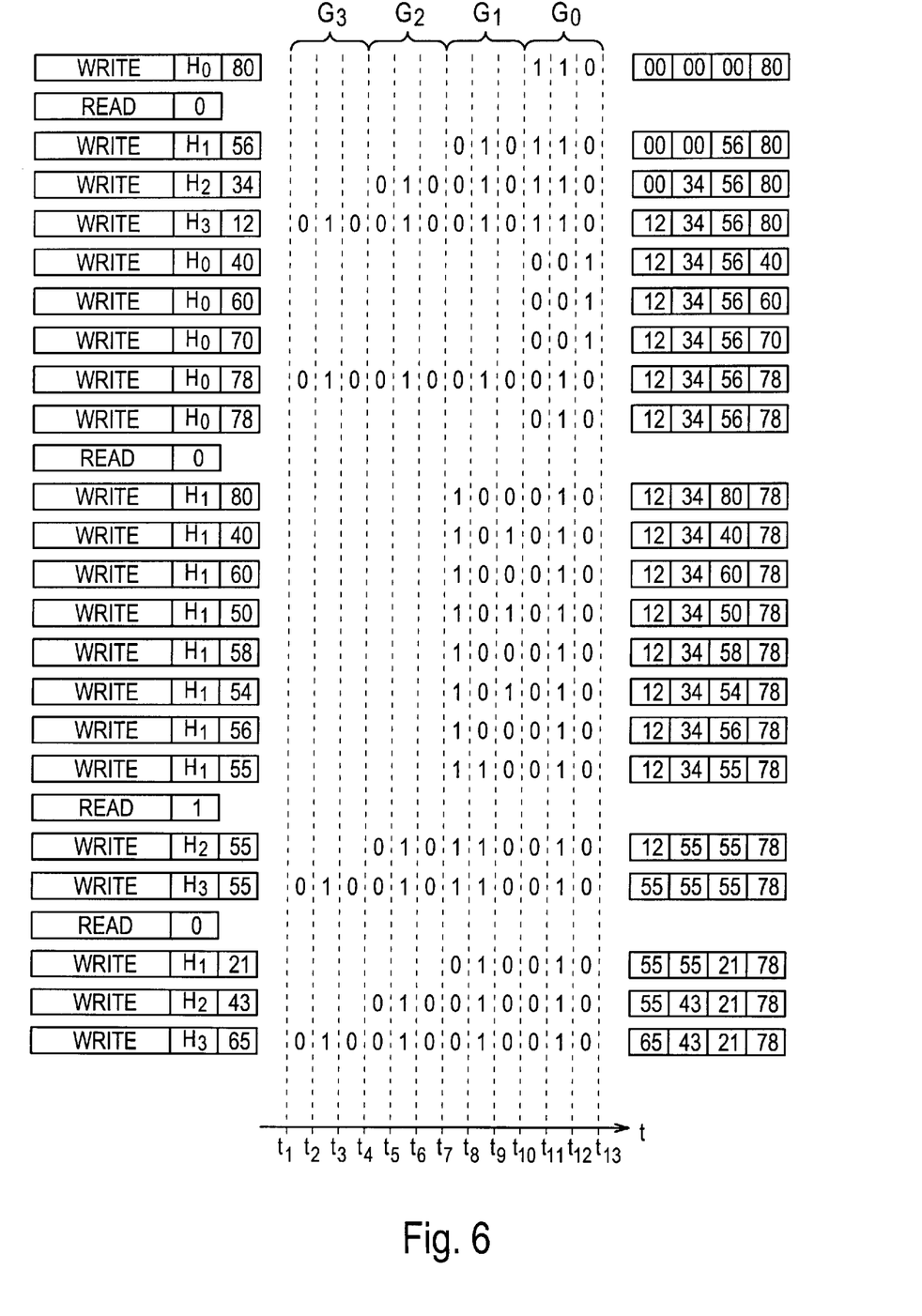
FIG. 6 shows how an identification process takes place in the presence of four transponders when performing the first implementation of the invention.

With reference to FIG. 6, there follows a description of an implementation of the method to identifying four transponders having the following serial numbers: 12345678, 12345680, 65432178, 55555578.

The comparison registers of the four transponders are initially at 00000000, and the method begins by loading hexadecimal 80 in the least significant byte $S_0$ by the analysis apparatus 3 transmitting the order to write the value 80 at address $H_0$ (the contents of the comparison register is shown on the right of FIG. 6).

In response to this write order, the analysis apparatus receives the signal 110 in group $G_0$ of time windows associated with byte $S_0$, i.e. at least one of the four transponders transmits binary value 1 in the time window extending between instants $t_{11}$ and $t_{12}$, which means that the least significant byte $S_0$ of the serial number of at least one of the transponders is equal to 80.

The analysis apparatus 3 then transmits a read order with p=0. which causes the, or each, transponder whose least significant byte $S_0$ is equal to the contents of address $H_0$ of the comparison register to read its own serial number.

Since only one of the four transponders in the example described has a serial number that terminates in hexadecimal value 80, the analysis apparatus 3 can read the serial number 12345680 transmitted by that transponder and can store it.

Thereafter, to put that transponder into standby mode, the analysis apparatus 3 sends in succession orders to write the value 56 at address $H_1$ of the comparison register, the value 34 at address $H_2$ of the comparison register, and the value 12 in the most significant byte $H_3$ of the comparison register.

Once this transponder has been put on standby, there still remain three transponders to be identified, i.e. the transponders having the following serial numbers: 12345678, 65432178, and 55555578.

Because it has received binary value 1 in the time window extending between instants $t_{12}$ and $t_{13}$, the analysis apparatus 3 knows that all of the remaining transponders have byte $S_0$ less than the hexadecimal value 80 contained at address $H_0$ of the comparison register.

Consequently, it decreases the contents at address $H_0$, and takes 40 as the new value for comparison purposes i.e. it takes half the hexadecimal value 80.

The analysis apparatus 3 then sends the order to write hexadecimal value 40 at address $H_0$, to which the transponders respond by transmitting the signal 001 in time window group $G_0$, i.e. binary value 1 in the time window that extends between instants $t_{12}$ and $t_{13}$, since every one of them has a byte $S_0$ that is greater than 40.

The analysis apparatus 3 then again changes the contents of address $H_0$ of the comparison register, each time to a value that is halfway along a range whose end values are respectively greater than and less than the value to be determined.

The analysis apparatus 3 thus sends in succession orders to write the following hexadecimal values in address $H_0$ of the comparison register: 60, then 70, and finally 78.

The analysis apparatus 3 then receives from all three transponders binary value 1 in the time window which extends between instants $t_{11}$ and $t_{12}$.

It can happen, exceptionally, as illustrated in the example under consideration, that the comparison register of a transponder finds itself loaded by chance with the full value of its own serial number during the successive iterations for identifying the transponders.

Under such circumstances, the transponder in question transmits binary value 1 in the second time window of each of the four groups $G_3$, $G_2$, $G_1$, and $G_0$ of the time windows in order to inform the analysis apparatus 3 that it has a match between each of the bytes of its comparison register and each of the bytes of its serial number.

Thereafter, this identified transponder switches to standby however the analysis apparatus has been able to store its serial number which is equal to 12345678 in this case.

The analysis apparatus 3 sends a read order requesting transmission from the, or each, transponder which has hexadecimal value 78 for the last byte $S_0$ of its is serial number.

In the example described, the two transponders that have not been identified both reply simultaneously, and since their serial numbers are different, there is interference between the information they transmit.

The analysis apparatus 3 is therefore incapable of reading the serial numbers and it deduces that there must be at least two transponders having a serial number that terminates in hexadecimal value 78.

In order to identify those transponders it is necessary to perform comparison on the next most significant byte $S_1$ of the serial numbers.

The analysis apparatus 3 thus begins a new identification process, modifying on each occasion the contents of address $H_1$ while leaving the contents of address $H_0$ unchanged. Hexadecimal value 80 is initially loaded into address $H_1$.

The transponders reply in groups $G_1$ and $G_0$ of time windows, with the signal received in group $G_1$ being 100 since both remaining transponders have respective bytes $S_1$ that are less than hexadecimal value 80.

Thereafter, the analysis apparatus 3 halves the contents of address $H_1$ of the comparison register, thereby causing binary value 1 to be sent in each of the time windows that extend between instants $t_7$ and $t_8$, and $t_9$ and $t_{10}$, since of the two remaining transponders, one has its byte $S_1$ less than hexadecimal value 40, and the other has its byte $S_1$ greater than hexadecimal value 40.

Initially, analysis apparatus 3 searches only for the transponder whose byte $S_1$ is greater than hexadecimal value 40, and this value is changed by successive range halving until hexadecimal value 55 is reached, thereby causing binary value 1 to be transmitted in the time window that extends between instants $t_8$ and $t_9$.

The analysis apparatus 3 then sends a read order with p=1 for the attention of the transponder for which there is a 16-bit match between the contents of the comparison register and its serial number, i.e. the transponder whose serial number is 55555578.

The analysis apparatus 3 receives this serial number and thereafter loads hexadecimal value 55 at addresses $H_2$ and $H_3$ of the comparison register so as to put this transponder into standby mode.

The analysis apparatus 3 has stored the fact that there exists a plurality of transponders having a serial number in which the least significant byte has hexadecimal value 78, and it has also identified one of them by making comparisons on the byte $S_1$ of the next higher significance, so it now sends a new read order to cause the remaining transponder (s) having byte $S_0$ equal to hexadecimal value 78 to transmit its or their serial number(s).

In the example under consideration, there is only one remaining transponder, the transponder whose serial number is 65432178.

The analysis apparatus 3 thereafter loads this serial number into the comparison register, thereby putting that transponder on standby.

The person skilled in the art will have observed on reading the above that each transponder is identified while using a relatively small number of iterations, thus making it possible to identify a large number of transponders quickly, with each transponder being identified in 250 ms on average, for example.

In the example described with reference to FIG. 6, the contents of the comparison register is never reinitialized to 00000000.

In a variant that is not shown, each transponder transmits only in the time window $G_n$ corresponding to the significance n of the byte most recently loaded into the comparison register, and the comparison register is reinitialized to 00000000 each time the serial number of a transponder has been determined.

Figure 7:
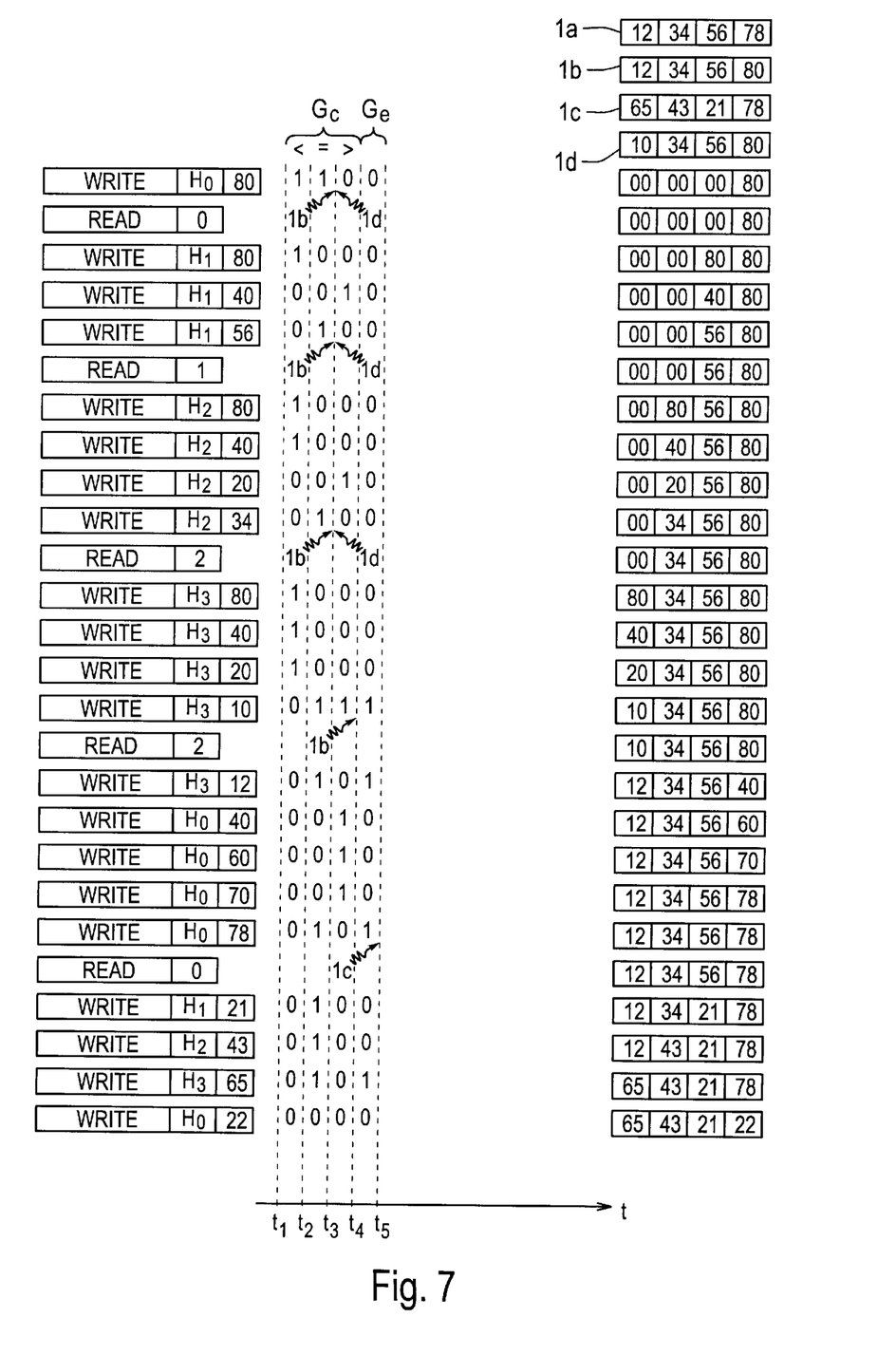
FIG. 7 shows how an identification process takes place in the presence of four transponders when performing a second implementation of the invention.

There follows a description, with reference to FIG. 7 of a second implementation of the invention.

It is assumed that four transponders $1a$, $1b$, $1c$, and $1d$ having respective identity codes 12345678, 12345680, 65432178, and 10345680 are placed in the field of an analysis apparatus 3.

The transponders $1a$ to $1d$ have a comparison register H identical to that of the transponders described above.

The transponders $1a$ to $1d$ are organized to transmit the result of a comparison between the binary word $H_n$ placed most recently in the comparison register H and the word $S_n$ of corresponding weight in the serial number S, in one of three time windows of a group Gc of three time windows corresponding respectively to the cases where the result of the comparison is less than, equal to, or greater than, said time windows extending respectively between instants $t_1$ and $t_2$, $t_2$ and $t_3$, and $t_3$ and $t_4$. Each transponder $1a$ to $1d$ transmits the result of a comparison relating to a byte $S_n$ of its serial number only if all the bytes $S_m$ of smaller weight in the serial number for m lying in the range 0 to n−1 are respectively equal to the corresponding bytes $H_m$ of the comparison register.

The transponders $1a$ to $1d$ are also organized to transmit in a fourth time window Ge extending between instants $t_4$ and $t_5$ when the serial number is equal to the contents of the comparison register. In the event of such a match, the transponder that has just transmitted in this fourth time window puts itself into a standby mode for the remainder of the identification method.

In this case, the analysis apparatus 3 is suitable for analyzing the responses of as-yet unidentified transponders in the four above-mentioned time windows, i.e. the three time windows of the set Gc corresponding to the results of the comparisons performed by the as-yet unidentified transponders between the identity data most recently stored in their transponders and the corresponding portions of their respective identity codes as determined by the address selected by the analysis apparatus; and in the fourth time window Ge corresponding to the fact that the identity code of a transponder matches the entire identity data stored by said transponder in the various selected addresses.

In the method described with reference to FIG. 7, in general;

a) a byte of given significance $H_n$ of the comparison register H of every unidentified transponder is loaded with a value m by the analysis apparatus 3 transmitting an order to write said value m in said byte $H_n$;

b) said byte of given significance $H_n$ is compared within each unidentified transponder with the byte $S_n$ of corresponding significance in its serial number S;

c) depending on the result of the comparison, greater than, equal to, or less than, each unidentified transponder transmits a response respectively in the above-mentioned first, second, or third time window, providing the serial number bytes of significance smaller than the byte on which a comparison is actually being performed are all equal to the corresponding bytes of the comparison register;

d) within each unidentified transponder the comparison register is compared with the serial number and if they match, the transponder transmits in said fourth time window and then after transmitting in said fourth time window, the transponder is put into a standby mode;

e) the analysis apparatus 3 analyzes the responses; and f) in the event of a transmitter transmitting in said fourth time window, its serial number is determined as a function of the data that has been stored in the comparison register of that transponder;

g) in the event of none of the responses corresponding to a match between the byte of the most-recently given significance loaded into the comparison register and the byte of corresponding significance of the serial number, the method starts again at above step a) after modifying the value m previously loaded into the comparison register at the same address $H_n$ so as to reach, by a range-halving technique, the situation in which the analysis apparatus 3 detects a response corresponding to the fact that the value of the byte $H_n$ of given weight in the comparison register matches the byte $S_n$ of corresponding weight in the serial number of at least one transponder;

h) if there is a response corresponding to the fact that there is a match between the byte $H_n$ of given weight in the comparison register $H_n$ and the byte $S_n$ of corresponding weight of the serial number, the analysis apparatus 3 sends a read order causing every transponder in which said match has occurred to transmit its serial number;

i) in the event of it being impossible to read the serial numbers transmitted by the transponders in step h) because of interference, the byte $H_{n+1}$ of the comparison register having the next greater significance is loaded with a given value m, and said value is modified, where necessary, by a range-halving technique so as to obtain, on analyzing the responses delivered by the transponders, a response corresponding to the fact that there is a match between the value of the byte of given significance most recently loaded into the comparison register and the corresponding portion of the serial number in at least one transponder, in which case a read order is transmitted causing every transponder for which said match occurs to transmit its serial number;

j) when it is possible to read a serial number because only one transponder is responding, said serial number is stored and then the comparison registers of said transponder is loaded with this serial number so as to put it in standby mode; and k) in the event of it being impossible to read the serial numbers transmitted by the transponders because of interference, the method starts again at step i).

More particularly, the method begins by loading byte $H_0$ of the comparison registers of all four transponders in FIG. 7 with hexadecimal value 80.

The transponders 1a and 1c whose corresponding serial number byte is 78 transmit in the time window lying between instants $t_1$ and $t_2$ to inform the analysis apparatus that the value of the corresponding byte $S_0$ of their serial numbers is less than 80.

The transponders 1b and 1d transmit in the time window that extends between instants $t_2$ and $t_3$ to inform the analysis apparatus 3 that the value of the corresponding byte in their serial numbers is 80.

Thereafter the analysis apparatus asks the transponders that have replied in the second time window to transmit their serial numbers. Specifically, the transponders 1b and 1d transmit simultaneously so there is a collision, and the analysis apparatus 3 detects the collision.

The analysis apparatus 3 then loads hexadecimal value 80 into the byte having the next greater significance of the comparison register, i.e. byte $H_1$.

The transponders 1b and 1d then reply in the first time window.

The analysis apparatus 3 then transmits again so as to modify the value of byte $H_1$ in the comparison register, changing it to 40.

This time, the transponders 1b and 1d transmit in the third time window since the values of the corresponding bytes $S_1$ of their respective serial numbers are all greater than 40.

The analysis device 3 proceeds by a range-halving technique and after a few iterations loads hexadecimal value 56 into byte $H_1$.

The transponders 1b and 1d then reply in the second time window.

The analysis apparatus 3 again requests all of the transponders that have replied in the second time window to transmit their respective serial numbers.

The transponders 1b and 1d still reply simultaneously, thereby giving rise to a collision which is detected by the analysis apparatus 3.

The analysis apparatus then loads hexadecimal value 80 into the next most significant byte of the comparison register, i.e. $H_2$.

The transponders 1b and 1d respond in the first time window. The analysis apparatus 3 then halves the value in byte $H_2$, so that it becomes 40. The transponders 1b and 1d respond again in the first time window.

After a few iterations, not shown, the value of the byte $H_2$ is hexadecimal 34, and the transponders 1b and 1d reply in the second time window.

The analysis apparatus 3 again requests the transponders that have responded in the second time window to transmit their identity codes. The transponders 1b and 1d respond simultaneously, giving rise yet again to a collision which is detected by the analysis apparatus 3. This apparatus then loads the value 80 into byte $H_3$ of the comparison register and after a certain number of iterations, as shown in FIG. 7, the value of register $H_3$ becomes, equal to 10. Only the transponder 1d then transmits in the second time window, and since the contents of its comparison register then is equal to its serial number, this transponder 1d also transmits in the fourth time window. The analysis apparatus detects this transmission and stores the content of the comparison register. The transponder 1d which has just transmitted in the fourth time window puts itself into standby mode.

The analysis apparatus 3 then requests the other transponders that have previously responded to the order to transmit their respective serial numbers to transmit again. This request is made by sending an order to the transponders requiring them to transmit their serial numbers if the value of byte $H_3$ (i.e. the byte of significance next smaller than that which the most recent comparison register modifications applied) is equal to the corresponding byte $S_2$ of their serial numbers.

In this case, only transponder 1b transmits its serial number, having its byte $S_3$ equal to 12.

The analysis apparatus then loads the value 12 into byte $H_3$ of the comparison register to put transponder 1b into standby mode.

Thereafter, the analysis apparatus 3 takes up the identification method by modifying the value of byte $H_0$ in the comparison register and by range halving this value ends up by being equal to 78.

The transponder 1c then responds in the second and fourth time windows and then puts itself into standby mode.

The analysis apparatus 3 then requests all of the other transponders that responded in the second time window to send their identity numbers.

Only the transponder 1c responds, thereby enabling it to be identified. Thereafter, the analysis apparatus loads the comparison register with the serial number of said transponder so as to put it into standby mode as well.

Finally, when the analysis apparatus seeks to continue the identification method and loads a new value, specifically 22 into byte $H_0$, no transponder responds, meaning that all of the transponders have been identified, and have been put into standby mode.

The data transmitted by the transponders is preferably preceded and followed by a synchronization signal.

It is possible initially, before the identification method has been implemented, that not all of the transponders are reached simultaneously by the field of the antenna 2 when the apparatus 3 is activated, or that the smoothing capacitors they contain do not all have the same charging time, in which case they will not all be activated simultaneously.

This means that the transponders will not all respond synchronously, such that the signals transmitted by the transponders interfere so that the analysis apparatus cannot read them.

That is why, in the event of interference, transmission from the analysis apparatus is interrupted for a given length of time, and then transmission is restarted, so that all of the transponders are synchronized when transmission is restarted.

If in spite of that there continues to be interference, then there is an anomaly, and the analysis apparatus 3 gives a warning.

Naturally, the invention is not restricted to the implementations described above.

In particular, in the implementations described, the comparison register has four bytes, but in a variant that is not shown, it could have a greater or smaller number of binary words each of which could have a greater or smaller number of bits.

Once the serial numbers are known, the number of transponders present in the field of the antenna 2 is also known, and it is possible to address each of them individually.

To address a transponder individually, it suffices to load the comparison register with its serial number and then send a special instruction instructing the transponder whose serial number is equal to the contents of the comparison register to enter into communication with the analysis apparatus 3 for the purpose of reading or writing information in its own memory 13.

Although the invention has been described by making comparisons initially on the least significant byte $S_0$ of the serial number, and subsequently making comparisons where necessary on the more significant bytes $S_1$, $S_2$, $S_3$, it would not go beyond the ambit of the present invention to start by making comparisons on the most significant byte $S_3$, and subsequently, and where necessary, making comparisons on the less significant bytes $S_2$, $S_1$, and $S_0$.

What is claimed is:

1. A method of identifying a set of transponders situated in the field of an analysis apparatus, each transponder having a different identity code in memory, the method comprising:
   a) causing the analysis apparatus to transmit data for comparison with a portion of the identity code as selected by the analysis apparatus, said portion comprising a byte;
   b) causing each as-yet unidentified transponder to compare the received data and the portion of its identity code as selected by the analysis apparatus;
   c) causing each as-yet unidentified transponder to transmit in at least one time window selected from a set of time windows common to the set of transponders as a function of the result of said comparison; and
   d) causing the analysis apparatus to analyze the data transmitted by the transponders in said set of time windows, and when the data transmitted by the transponders does not enable a transponder identity code to be determined, at least in part, causing the apparatus to start again with data that has been modified in such a manner that, within a finite number of iterations, the transponders are caused to transmit data enabling the identity code of at least one of the transponders to be determined, at least in part.

2. A method according to claim 1, wherein each transponder includes a comparison register in which the data for comparison is stored.

3. A method according to claim 2, wherein said comparison register is organized to store a plurality of binary words, wherein the identity code is constituted by binary words, wherein the analysis apparatus (3) modifies, one at a time, a binary word of given significance (n) in the comparison register, and wherein each as-yet unidentified transponder compares the most-recently modified binary word and the binary word of corresponding significance in the identity code of the transponder, the portion of the identity code on which comparison is to be performed being selected by selecting the significance of each new binary word that is to be stored in the comparison register.

4. A method according to claim 3, wherein each transponder transmits in a first set of time windows the result of comparing the most-recently modified binary word and the portion of the identity code of the transponder that has been selected by the analysis apparatus, providing the bytes of the identity code of the transponder already determined by the analysis apparatus are respectively equal to the corresponding bytes of the comparison register, and transmits in a second set of time windows the result of comparing the entire comparison register with the entire identity code.

5. A method according to claim 4, wherein said second set of time windows is reduced to a single time window in which each transponder transmits in the event of a match between the comparison register of the transponder and the identity code of the transponder.

6. A method according claim 1, further comprising:
   causing the analysis apparatus, whenever the data previously received thereby makes this possible, to determine at least a portion of the identity code of one or more transponders, to send an order causing said transponder(s) to transmit its/their identity code(s); and
   analyzing said identity code(s) as received to determine whether only one identity code was transmitted or whether there has been interference associated with a plurality of different codes being transmitted, and in the event of only one identity code being received, storing said code.

7. A method according to claim 6, wherein when a plurality of transponders transmit a plurality of different identity codes simultaneously and they interfere with one another, the method further includes the step consisting in sending new data to be compared with a new portion of the identity code in said transponders, other than the portion already determined by the analysis apparatus, optionally in modifying said new data until said new identity code portion has been determined, and thereafter in causing the transponder(s) for which the new identity code portion has been determined to transmit its/their identity code(s), and in the event of interference restarting the process for determining the identity code again by causing the comparison to be performed on an as-yet undetermined portion of the identity code, until only one identity code is received from the transponders.

8. A method according to claim 1, wherein each identified transponder is put into a standby mode in which the transponder ceases to transmit the result of comparing the identity code of the transponder with the data transmitted by the analysis apparatus.

9. A method according to claim 8, wherein each transponder that has been identified is put into said standby mode by using the analysis apparatus to transmit the identity code of the transponder.

10. A method according to claim 2, wherein each transponder whose comparison register is equal to the identity code of the transponder puts the transponder into a standby mode.

11. A method of identifying the serial number of all the transponders in a plurality of transponders located simultaneously in the field of an analysis apparatus, each transponder having a comparison register capable of storing a plurality of bytes, in which method;

a) a byte of given significance of the comparison register in all of the unidentified transponders is loaded with a value by causing the analysis apparatus to send an order to write said value in said byte:
   b) within each transponder said byte of given significance is compared with the byte of corresponding significance in the serial number of the transponder;
   c) for this byte of given significance of the comparison register, and depending on the result of the comparison, greater than, or equal to, or less than, every as-yet unidentified transponder transmits a response respectively in a first, a second, or a third time window of a group of three time windows associated with the significance of the byte on which the comparison has been performed, said group being selected from a plurality of time window groups respectively associated with bytes of different significance of the comparison register, each as-yet unidentified transponder transmitting the result of comparing the byte of given significance most recently loaded into the comparison register with the corresponding byte of the serial number of the transponder, with the proviso, when the byte of given significance on which comparison is being performed is not the least significant byte, respectively the most significant, that there is a match between the less significant bytes, respectively the more significant, of the comparison register and the corresponding bytes of the serial number;
   d) the analysis apparatus is caused to analyze the responses, and:
      when none of the responses corresponds to a match between the byte of given significance most recently loaded into the comparison register and the byte of corresponding significance in the serial number, the method begins again at above step a) by modifying the value previously loaded into the comparison register at the same address by a range-halving technique so as to reach a situation in which the analysis apparatus detects a response corresponding to the fact that the value of the byte of given significance in the comparison register matches the byte of corresponding significance in the serial number;
      if one of the responses corresponds to the fact that there is a match between the byte of given significance in the comparison register and the byte of corresponding significance in the serial number, the analysis apparatus is caused to send a read order causing every transponder for which a match has occurred to send its serial number:
         if the serial numbers transmitted by the transponders are unable to be read because of mutual interference, a given value is loaded into the next most, respectively least, significant byte of the comparison register, and said value is modified by a range-halving technique until analysis of the responses from the transponders indicates a match with the corresponding byte of the serial number; and
         when a serial number can be read because only one transponder is responding, said serial number is stored.

12. A method of identifying the serial number of each transponder in a plurality of transponders placed simultaneously in the field of an analysis apparatus, each transponder having a comparison register capable of storing a plurality of bytes, in which method:

a) a byte of given significance of the comparison register of every unidentified transponder is loaded with a value by the analysis apparatus transmitting an order to write said value in said byte;
   b) said byte of given significance is compared within each transponder with the byte of corresponding significance in the serial number of the transponder;
   c) depending on the result of the comparison, greater than, equal to, or less than, each unidentified transponder transmits a response respectively in a first, a second, or a third time window, providing the serial number bytes of significance smaller, respectively higher, than the byte on which a comparison is actually being performed are all equal to the corresponding bytes of the comparison register;
   d) within each unidentified transponder, the comparison register is compared with the serial number and if they match, the transponder transmits in a fourth time window and then after transmitting in said fourth time window, the transponder is put into a standby mode;
   e) the analysis apparatus analyzes the responses; and
   f) in the event of a transmitter transmitting in said fourth time window, its serial number is determined as a function of the data that has been stored in the comparison register of that transponder;
   g) in the event of none of the responses corresponding to a match between the byte of the most-recently given significance loaded into the comparison register and the byte of corresponding significance of the serial number, the method starts again at above step a) after modifying the value previously loaded into the comparison register at the same address so as to reach, by a range-halving technique, the situation in which the analysis apparatus detects a response corresponding to the fact that the value of the byte of given weight in the comparison register matches the byte of corresponding weight in the serial number of at least one transponder;
   h) if there is a response corresponding to the fact that there is a match between the byte of given weight in the comparison register and the byte of corresponding weight of the serial number, the analysis apparatus sends a read order causing every transponder in which said match has occurred to transmit the serial number of the transponder;
   i) if the serial numbers transmitted by the transponders are unable to be read in step h) because of interference, the byte of the comparison register having the next greater, respectively smaller, significance is loaded with a given value, and said value is modified, where necessary, by a range-halving technique so as to obtain, on analyzing the responses delivered by the transponders, a response corresponding to the fact that there is a match between the value of the byte of given significance most recently loaded into the comparison register and the corresponding portion of the serial number in at least one transponder, in which case a read order is transmitted causing every transponder for which there is a match to transmit the serial number of the transponder;

j) when a serial number is read because only one transponder is responding, said serial number is stored and then the comparison registers of all the transponders are loaded with this serial number so as to put the transponder which responded in standby mode; and k) if the serial numbers transmitted by the transponders are unable to be read because of interference, the method starts again at step i).

13. A transponder comprising an identification code including a serial number stored in a memory and means for remote communication with an analysis apparatus the transponder comprising a comparison register in which data from the analysis apparatus can be stored, calculation means for comparing at least a portion of the identity code, said portion comprising a byte, with at least a portion of the comparison register, and means for transmitting the result of the comparison in at least one time window selected from a set of time windows, said at least one time window depending on the result of the comparison.

14. A transponder according to claim 13, wherein the comparison register (H) is constituted by a plurality of binary words ($H_3$, $H_2$, $H_1$, $H_0$) of different significance, and by the fact that said calculation means (10) are organized to compare the binary word ($H_n$, m) most recently stored in the register with a binary word of corresponding significance ($S_n$) of the identity code.

15. A transponder according to claim 14, wherein the transponder is organized to transmit the result of the comparison between the binary word most recently stored in the register and the binary word of corresponding significance of the serial number, except in the event of the comparison being performed on a word other than the least, respectively most, significant binary word and there is no match between the binary word(s) of significance less, respectively higher, than that of the word most recently stored in the register and the corresponding binary word(s) of the identity code.

16. A transponder according to claim 13, wherein the comparison register has four bytes.

17. A transponder according to claim 13, wherein the transponder is organized to transmit the result of the comparison only once when the contents of the comparison register matches the identity code.

18. A transponder according to claim 14, wherein the transponder is organized to transmit the result of comparing the binary word most recently stored in the comparison register of the transponder and the word of corresponding significance of the serial number of the transponder in one of three time windows corresponding respectively to the case where the result of the comparison is less than, equal to, and greater than.

19. A transponder according to claim 18, wherein the transponder is organized also to transmit in a fourth time window when the serial number of the transponder matches the comparison register.

20. Analysis apparatus for a plurality of transponders having different identity codes, comprising processor means organized to determine the identity codes of a plurality of transponders placed in the field of the analysis apparatus, said analysis apparatus being suitable for;

transmitting a write order associated with identity data, said order causing said identity data to be stored in the transponders at a particular address selected by the analysis apparatus;

analyzing the response from as-yet unidentified transponders in a set of time windows after said identity data has been transmitted;

transmitting a read order to cause the transponders whose identity codes have been determined in part to send their identity codes in full;

transmitting a new write order associated with new identity data in the event of interference between the data transmitted by the transponders, so as to end up by causing only one transponder at a time to send its identity code, and storing said code; and repeating the above steps so as to identify all of the transponders in turn, wherein the analysis apparatus is suitable for:

analyzing the responses of as-yet unidentified transponders in four time windows, three of the time windows corresponding to the results of comparisons performed by the as-yet unidentified transponders between the identity data most recently stored in the transponders and a portion of their respective identity codes as determined by the address selected by the analysis apparatus, transmission by a transponder in the fourth time window corresponding to the fact that the identity code of the transponder matches the entire identity data stored by said transponder in the various selected addresses.

21. Apparatus according to claim 20, wherein the analysis apparatus is suitable for:

analyzing the responses of as-yet unidentified transponders in four time windows, three of the time windows corresponding to the results of comparisons performed by the as-yet unidentified transponders between the identity data most recently stored in the transponders and a portion of their respective identity codes as determined by the address selected by the analysis apparatus, transmission by a transponder in the fourth time window corresponding to the fact that the identity code of the transponder matches the entire identity data stored by said transponder in the various selected addresses.

22. Apparatus according to claim 20, wherein the apparatus includes an antenna constituted by a solenoid in which the transponders are placed.

23. A method of enabling transponders situated in the field of an analysis apparatus to be identified, each transponder having a different identity code, the method comprising:

a) using the analysis apparatus to transmit data to be compared with a portion of the identity code selected by the analysis apparatus, said portion comprising a byte;

b) within each unidentified transponder, comparing the received data and a corresponding portion of the transponder's identity code;

c) causing each unidentified transponder to transmit in at least one time window selected from a set of time windows common to the set of transponders;

d) using the analysis apparatus to analyze the data transmitted by the transponders in said set of time windows, and when the data transmitted by the transponders does not enable at least part of the identity code of at least one of the transponders to be identified, beginning again with data modified in such a manner that, after a finite number of iterations, the transponders transmit data to determine at least a part of the identity code of at least one of the transponders;

e) causing the analysis apparatus, when the data previously received thereby to determine at least a portion of the identity code of one or more transponders, to transmit an order causing every such transponder to transmit its own identity code; and f) analyzing reception of the identity code to determine whether a single identity code has been transmitted or whether interference has occurred associated with simultaneous transmission of a plurality of different codes, and when only one identity code is received, storing said code.

24. Analysis apparatus and a set of transponders for implementing the method defined in claim 23.

25. A method of identifying a set of transponders situated in the field of an analysis apparatus, each transponder having a different identity code, the method comprising:

a) causing the analysis apparatus to transmit data comprising more than one bit, b) causing unidentified transponders to compare said data and a portion of their identity code comprising more than one bit to determine whether said data are inferior, superior or equal to said portion of their identity code, c) causing said unidentified transponders to transmit the result of said comparison, and d) causing the analysis apparatus to analyze the data transmitted by the transponders, and when the data transmitted by the transponders does not enable a transponder identity code to be determined at least in part, causing the apparatus to start again with data that has been modified.

26. A transponder comprising:

an identity code, a receiver being configured for remote communication with an analysis apparatus, and a comparison register in which data transmitted by the analysis apparatus can be stored, said transponder being configured to determine whether said data stored in the comparison register are inferior, superior or equal to at least a portion of the identity code, comprising more than one bit.

27. An analysis apparatus for a plurality of transponders having different identity codes, comprising processor means organized to determine the identity codes of a plurality of transponders, said analysis apparatus being suitable for:

transmitting a write order associated with identity data to be stored in the transponders, analyzing the response from the transponders in a set of time windows corresponding to the results of comparisons performed by the transponders between the identity data most recently stored in the transponders and a portion of their identity code as selected by the analysis apparatus, transmitting a new write order associated with new identity data, repeating the above steps so as to identify all of the transponders in turn.

28. A transponder comprising an identification code and an emitter and receiver for remote communication with an analysis apparatus, the transponder comprising a comparison register in which data transmitted by the analysis apparatus and to be compared to at least a portion of the identity code can be stored, said portion comprising more than one bit, wherein the receiver is arranged for transmitting the result of the comparison in at least one time window selected from a set of time windows, depending on the result of the comparison.

29. A transponder comprising:

an identity code;

a comparison register in which data from an analysis apparatus can be stored;

a calculator for comparing at least a portion of the identity code with at least a portion of the comparison register; and an emitter for transmitting the result of the comparison in at least one time window selected from a set of time windows, the at least one selected time window depending on the result of the comparison, said result being one of superior, inferior or equal.

30. A transponder comprising:

an identity code;

a receiver for remote communication with an analysis apparatus; and a calculator for comparing at least one portion of the identity code with data received from the analysis apparatus, to determine whether said data is inferior, superior or equal to said at least one portion of the identity code.

31. A transponder comprising:

a serial number;

a comparison register in which data from an analysis apparatus can be stored;

a calculator for comparing at least a portion of the serial number with at least a portion of the comparison register; and an emitter for transmitting the result of the comparison in at least one time window selected from a set of time windows, the at least one selected time window depending on the result of the comparison, said result being one of superior, inferior equal.

32. A transponder comprising:

an identity code;

a comparison register in which data from an analysis apparatus can be stored;

an emitter; and a calculator being configured to supply said emitter with information representative of the result of a comparison between at least a part of said identity code and data stored in the comparison register, said result being one of superior, inferior or equal.

* * * * *